(12) United States Patent
Wyville et al.

(10) Patent No.: US 10,581,473 B2
(45) Date of Patent: Mar. 3, 2020

(54) NON-LINEAR INTERFERENCE DETECTION

(71) Applicant: Telefonaktiebolaget LM Ericsson (publ), Stockholm (SE)

(72) Inventors: Mark William Wyville, Ottawa (CA); Pierre-Andre Laporte, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/082,193

(22) PCT Filed: Mar. 7, 2017

(86) PCT No.: PCT/IB2017/051342
§ 371 (c)(1),
(2) Date: Sep. 4, 2018

(87) PCT Pub. No.: WO2017/153921
PCT Pub. Date: Sep. 14, 2017

(65) Prior Publication Data
US 2019/0319653 A1    Oct. 17, 2019

Related U.S. Application Data

(60) Provisional application No. 62/304,664, filed on Mar. 7, 2016.

(51) Int. Cl.
*H03D 1/04* (2006.01)
*H04B 1/10* (2006.01)
*H04B 1/04* (2006.01)
*H04B 1/12* (2006.01)
*H04B 1/525* (2015.01)

(52) U.S. Cl.
CPC ............ *H04B 1/1027* (2013.01); *H04B 1/04* (2013.01); *H04B 1/126* (2013.01); *H04B 1/525* (2013.01); *H04B 2001/0425* (2013.01)

(58) Field of Classification Search
CPC ........ H04B 1/1027; H04B 1/126; H04B 1/04; H04B 1/525; H04B 2001/0425
USPC ......................................................... 375/346
See application file for complete search history.

(56) References Cited

U.S. PATENT DOCUMENTS

| 2008/0039045 | A1  | 2/2008 | Filipovic et al. |
| 2010/0159837 | A1* | 6/2010 | Dent ...................... H04B 1/525 455/63.1 |
| 2010/0159858 | A1  | 6/2010 | Dent et al. |

(Continued)

OTHER PUBLICATIONS

International Search Report and Written Opinion of the International Searching Authority dated Jun. 6, 2017 issued in corresponding PCT Application Serial No. PCT/IB2017/051342, consisting of 10 pages.

*Primary Examiner* — Don N Vo
(74) *Attorney, Agent, or Firm* — Sage Patent Group

(57) ABSTRACT

A method, detector and radio unit for non-linear interference detection in a communication system having a victim signal and an offending signal are disclosed. According to one aspect, a method includes determining a magnitude of the victim signal raised to a first power to produce a first signal. The method also includes determining a magnitude of the offending signal raised to a second power to produce a second signal. The first signal and the second signal are correlated to produce an output signal indicative of an extent to which the offending signal interferes with the victim signal.

20 Claims, 6 Drawing Sheets

(56) References Cited

U.S. PATENT DOCUMENTS

2013/0044016 A1\* 2/2013 Matsuno ............. H03M 1/0614
    341/118
2015/0223083 A1 8/2015 Maca et al.
2015/0257165 A1 9/2015 Gale et al.
2016/0142229 A1\* 5/2016 Bevan .................... H04B 1/123
    455/307

\* cited by examiner

NON-LINEAR INTERFERENCE DETECTION

CROSS-REFERENCE TO RELATED APPLICATIONS

This application is a Submission Under 35 U.S.C. § 371 for U.S. National Stage Patent Application of International Application No.: PCT/IB2017/051342, filed Mar. 7, 2017 entitled "NON-LINEAR INTERFERENCE DETECTION," which claims priority to U.S. Provisional Application No. 62/304,664, filed Mar. 7, 2016, entitled "NON-LINEAR INTERFERENCE DETECTION," the entireties of both of which are incorporated herein by reference.

TECHNICAL FIELD

This disclosure relates to wireless communication and in particular, to detection of non-linear interference in a receiver.

BACKGROUND

Non-linear interference is generated when at least one offending signal experiences some non-linear behavior. This non-linear behavior could be experienced anywhere the offending signals are present. The non-linear behavior could be in a radio, signal transmission line network, antenna system, or in the radio frequency (RF) environment where the offending signals are transmitted. One of the problems associated with non-linear interference is when the interference couples into a receiver and the interference overlaps an assigned frequency channel for the receiver. The interference will degrade the quality of the received signal in the receiver, thereby degrading performance.

In a cellular base station, this non-linear behavior can be attributed to the active components in the transmitter (such as the power amplifier), active components in the receiver (such as the low noise amplifier (LNA) or a frequency converter), or a passive device that exhibits passive intermodulation (PIM). The PIM sources could occur in many places. Some examples are in the radio's filter, connectors, cable assembly from the radio to the antenna, in multiplexers if multiple radios are multiplexed onto the same cable or antenna, in the antenna, or in the environment external to the antenna.

Non-linear interference generates interference at multiple frequencies. This interference can be problematic when some of the generated interference falls into an assigned receive channel of the base station. The interference can desensitize the receiver, thereby reducing performance of the receiver. To understand how non-linear interference is generated at multiple frequencies it is useful to model the non-linear behavior with a simple Taylor series with 1st (linear) and 3rd (non-linear) order terms. This model is:

$$y_{out}(t) = c_1 x_{in}(t) + c_3 x_{in}^3(t)$$

When the input signal consists of 2 modulated RF carriers, then the input signal can be expressed as $$x_{in}(t) = A_1(t)\cos[2\pi f_1 t + \varphi_1(t)] + A_2(t)\cos[2\pi f_2 t + \varphi_2(t)]$$

The first RF carrier in this expression has an amplitude modulation denoted by $A_1(t)$, a phase modulation denoted by $\varphi_1(t)$, and an RF carrier frequency of $f_1$.

The output signal has the following 8 frequency components:

$$y_{out}(t) = [c_1 A_1(t) + \tfrac{3}{4} c_3 A_1^3(t) + c_3 A_1(t) A_2^2(t)] \cos[2\pi f_1 t + \varphi_1(t)]$$

$$+ [c_1 A_2(t) + \tfrac{3}{4} c_3 A_2^3(t) + c_3 A_1^2(t) A_2(t)] \cos[2\pi f_2 t + \varphi_2(t)]$$

$$+ \tfrac{1}{2} c_3 A_1^2(t) A_2(t) \cos[2\pi(2f_1 - f_2)t + 2\varphi_1(t) - \varphi_2(t)]$$

$$+ \tfrac{1}{2} c_3 A_1(t) A_2^2(t) \cos[2\pi(2f_2 - f_1)t + 2\varphi_2(t) - \varphi_1(t)]$$

$$+ \tfrac{1}{2} c_3 A_1^2(t) A_2(t) \cos[2\pi(2f_1 + f_2)t + 2\varphi_1(t) + \varphi_2(t)]$$

$$+ \tfrac{1}{2} c_3 A_1(t) A_2^2(t) \cos[2\pi(2f_2 + f_1)t + 2\varphi_2(t) + \varphi_1(t)]$$

$$+ \tfrac{1}{4} c_3 A_1^3(t) \cos[2\pi 3 f_1 t + 3\varphi_1(t)]$$

$$+ \tfrac{1}{4} c_3 A_2^3(t) \cos[2\pi 3 f_2 t + 3\varphi_2(t)]$$

Of all these terms, the only linear terms are those that have $A_1(t)$ or $A_2(t)$ as their only amplitude modulation terms. The rest are non-linear interference terms, and can cause problems if any of them couple into a receiver that is operating in a frequency channel that overlaps with a non-linear interference term. Real non-linear behavior can also exhibit even-order non-linear terms, and terms with higher than 3rd order. The input signal in the above equation has 2 modulated carriers. However, the input signal can have multiple carriers at more than 2 frequencies, and can also have multiple carriers at the same frequency (an example of the latter is MIMO streams). The carriers do not need to be at an RF carrier frequency to cause non-linear interference. An example is a strong signal that generates distortion in the analog-to-digital converter in the analog baseband domain in a receiver.

The definition of some terms used in this disclosure are as follows:

Victim signal: this generally refers to a signal of a receiver that might have non-linear interference present. This signal can also have a desired received signal, noise and other interference.

Potential offending signal: this refers to the signals that could experience the non-linear behavior of some part or object. These are generally signals transmitted from base station antennas, or other nearby transmitting devices. These signals have the potential to generate non-linear interference.

Intermodulation interference may be detected by synthesizing the intermodulation products using the digital version of the transmitted signals. This can be done using a plurality of delays for the transmitted signals. The different intermodulation products are correlated with the actual received signal, and if the correlation data exceeds some threshold for some set of delays, then intermodulation interference has been detected. The synthesized intermodulation product is frequency shifted to align it with a real potential intermodulation product that might exist in the receiver.

With multiple transmit signals at multiple frequencies, there can be a lot of non-linear product combinations to try. The transmit signals making up a single non-linear product need to be time-aligned relative to each other before the product can be correlated with the received signal. A frequency shift must also be determined and applied prior to doing the correlation.

SUMMARY

Some embodiments advantageously provide a method, detector and radio unit for non-linear interference detection in a wireless communication system having a victim signal and an offending signal. According to one aspect, a method includes determining a magnitude of the victim signal raised to a first power to produce a first signal. The method also includes determining a magnitude of the offending signal raised to a second power to produce a second signal. The first signal and the second signal are correlated to produce an output signal indicative of an extent to which the offending signal interferes with the victim signal.

According to this aspect, in some embodiments, the first power and the second power are not equal. In some embodiments, the method further includes scaling at least one of the first and second signals prior to the correlation. In some embodiments, the method further includes scaling at least one of the victim signal and the offending signal. In some embodiments, the method further includes scaling the output signal. In some embodiments, the method further includes simultaneously performing the determining and correlating for each of a plurality of offending signals. In some embodiments, the method further includes determining a magnitude of a second offending signal raised to a third power to produce a third signal, and correlating the first signal with the third signal to produce a second output signal indicative of an extent to which the second offending signal interferes with the victim signal. In some embodiments, the method further includes comparing a magnitude of an output signal determined from a correlation involving a first offending signal to a magnitude of an output signal determined from a correlation involving a second offending signal. In some embodiments, the method further includes simultaneously performing the determining and correlating for each of a plurality of victim signals. In some embodiments, the method further includes determining from the output signal a delay between the victim signal and the offending signal.

According to another aspect, a non-linear interference detector is provided. The detector includes a first magnitude determiner configured to determine a magnitude of a victim signal raised to a first power to produce a first signal. The detector further includes a second magnitude determiner configured to determine a magnitude of an offending signal raised to a second power to produce a second signal. The detector further includes a correlator configured to correlate the first signal and the second signal to produce an output signal indicative of an extent to which the offending signal interferes with the victim signal.

According to this aspect, in some embodiments, the first power and the second power are not equal. In some embodiments, the detector further includes at least one multiplier configured to scale at least one of the first and second signals prior to the correlation. In some embodiments, the detector further includes at least one multiplier configured to scale at least one of the victim signal and the offending signal. In some embodiments, the detector further includes a multiplier configured to scale the output signal. In some embodiments, the determining and correlating for each of a plurality of offending signals are performed simultaneously. In some embodiments, the detector further includes a third magnitude determiner configured to determine a magnitude of a second offending signal raised to a third power to produce a third signal, and further includes a second correlator configured to correlate the first signal with the third signal to produce a second output signal indicative of an extent to which the second offending signal interferes with the victim signal. In some embodiments, the detector further includes a comparator configured to compare a magnitude of an output signal determined from a correlation involving a first offending signal to a magnitude of the output signal determined from a correlation involving the second offending signal. In some embodiments, the determining and correlating for each of a plurality of victim signals is performed simultaneously. In some embodiments, the detector further includes a delay determiner configured to determine from the output signal a delay between the victim signal and the offending signal.

According to yet another aspect, a radio unit configured to detect non-linear interference is provided. The radio unit includes processing circuitry including a memory and a processor. The memory is configured to store a correlation result. The processor is in communication with the memory and is configured to determine a magnitude of a victim signal raised to a first power to produce a first signal. The processor is also configured to determine a magnitude of an offending signal raised to a second power to produce a second signal. The processor is also configured to correlate the first signal and the second signal to produce an output signal indicative of an extent to which the offending signal interferes with the victim signal.

According to another aspect, a radio unit configured to detect non-linear interference is provided. The radio unit includes a first magnitude determiner module configured to determine a magnitude of a victim signal raised to a first power to produce a first signal, a second magnitude determiner module configured to determine a magnitude of an offending signal raised to a second power to produce a second signal, and a correlator module configured to correlate the first signal and the second signal to produce an output signal indicative of an extent to which the offending signal interferes with the victim signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
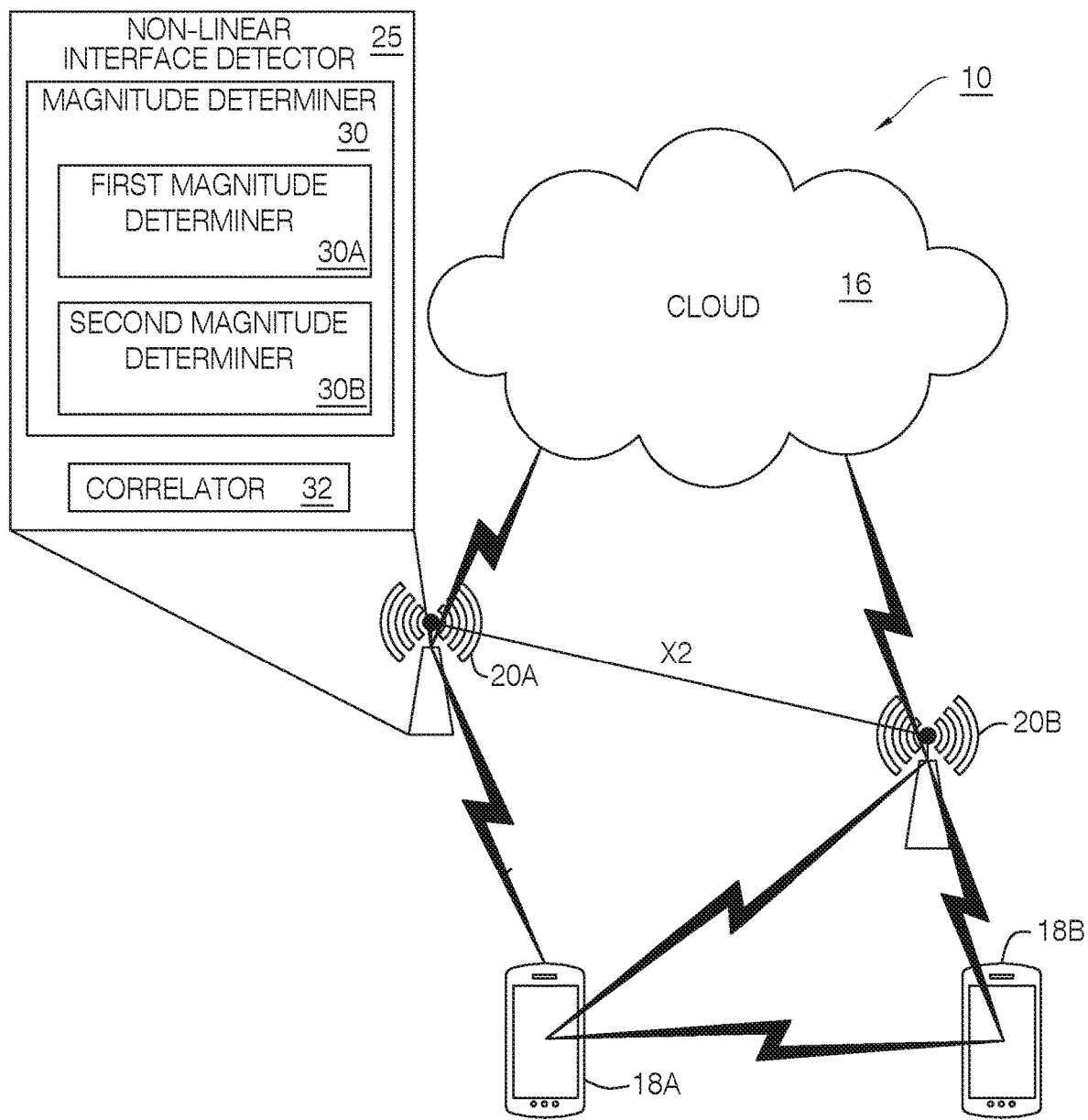
FIG. 1 is a block diagram of a wireless communication network constructed according to principles set forth herein.

Before describing in detail exemplary embodiments, it is noted that the embodiments reside primarily in combinations of apparatus components and processing steps related to detecting non-linear interference in a receiver. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments provide for detection of the presence of non-linear distortion in a victim signal that is caused by at least one potential offending signal. Some embodiments also provide the associated delay terms and amplitudes of the correlation data. In some embodiments, the victim signal (in which we want to detect non-linear interference) is processed to obtain a new signal that is representative of the victim signal's magnitude. Then, one potential offending signal is chosen to determine if it is involved in generating non-linear interference that exists in the victim signal. The potential offending signal is processed to get a new signal that is representative of the potential offending signal's magnitude. The new signal that is representative of the potential offending signal's magnitude is then correlated with the new signal that is representative of the victim signal's magnitude.

The maximum value of the correlation is indicative of how much the potential offending signal contributes towards non-linear interference in the victim signal. The maximum value occurs in the correlation at a delay that approximately represents an actual delay offset between the potential offending signal and the victim signal. For a given victim signal, this can be repeated for more than one potential offending signal. And all of this can be repeated for more than one victim signal.

In embodiments discussed herein, there is no need to synthesize non-linear interference terms, which would require determining several delay terms between the signals involved. There is also no need to determine and apply a frequency shift between the non-linear interference center frequency and the victim signal's frequency. Also, there is no need to consider more than one potential offending signal at a time.

Some embodiments detect non-linear interference by correlating the magnitude (or magnitude to some exponent) of the received signal with the magnitude (or magnitude to some exponent) of at least one potential offending signal. The non-linear interference could be generated by multiple offending signals, and method described herein can be used to determine which signals are involved.

Referring now to the drawing figures in which like reference designators refer to like elements, FIG. 1 is a block diagram of a wireless communication network 10 constructed in accordance with principles set forth herein. The wireless communication network 10 includes a cloud 16 which may include the Internet and/or the public switched telephone network (PSTN). Cloud 16 may also serve as a backhaul network of the wireless communication network 10. The wireless communication network 10 includes wireless devices 18A and 18B, referred to collectively herein as wireless devices 18. The wireless devices 18 are served by one or more base stations 20A and 20B, referred to collectively as base stations 20. Note that, although only two wireless devices 18 and two base stations 20 are shown for convenience, the wireless communication network 10 may typically include many more wireless devices (WDs) 18 and base stations 20.

A base station 20 includes a non-linear interference detector 25 that implements a magnitude determiner 30 and a correlator 32. The magnitude determiner 30 includes a first magnitude determiner 30A configured to determine a magnitude of a victim signal raised to a first power to produce a first signal. The magnitude determiner 30 also includes a second magnitude determiner 30B configured to determine a magnitude of an offending signal raised to a second power to produce a second signal. The correlator 32 is configured to correlate the first signal and the second signal to produce an output signal indicative of an extent to which the offending signal interferes with the victim signal.

The term wireless device or mobile terminal used herein may refer to any type of wireless device communicating with a base station 20 and/or with another wireless device 18 in a cellular or mobile communication system 10. Examples of a wireless device 18 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "base station" used herein may refer to any kind of radio base station in a radio network which may further comprise any base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Although embodiments are described herein with reference to certain functions being performed by base station 20, it is understood that the functions can be performed in other network nodes and elements. It is also understood that the functions of the base station 20 can be distributed across network cloud 16 so that other nodes can perform one or more functions or even parts of functions described herein.

Figure 2:
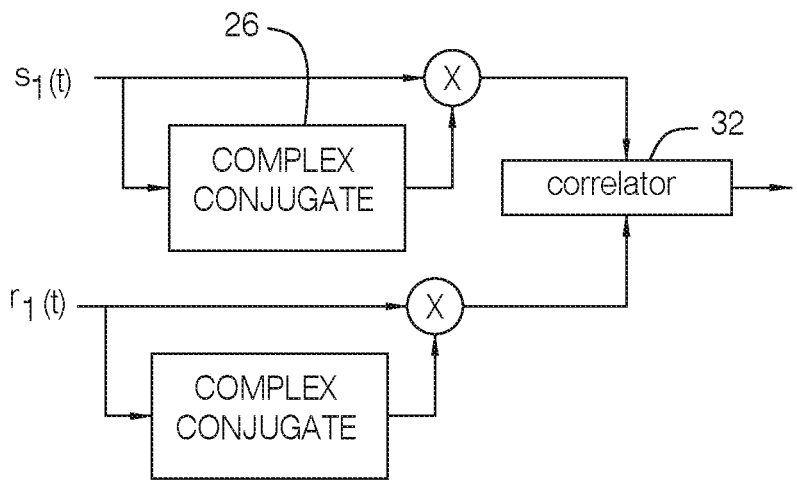
FIG. 2 is a first example of a magnitude correlator according to principles disclosed herein.
Figure 3:
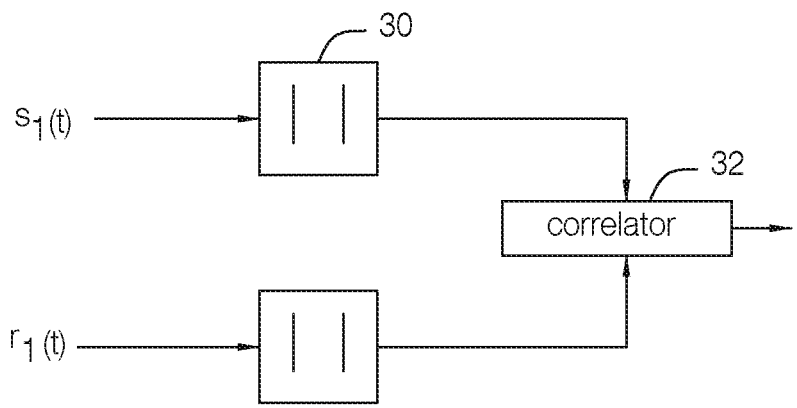
FIG. 3 is a second example of a magnitude correlator according to principles disclosed herein.
Figure 4:
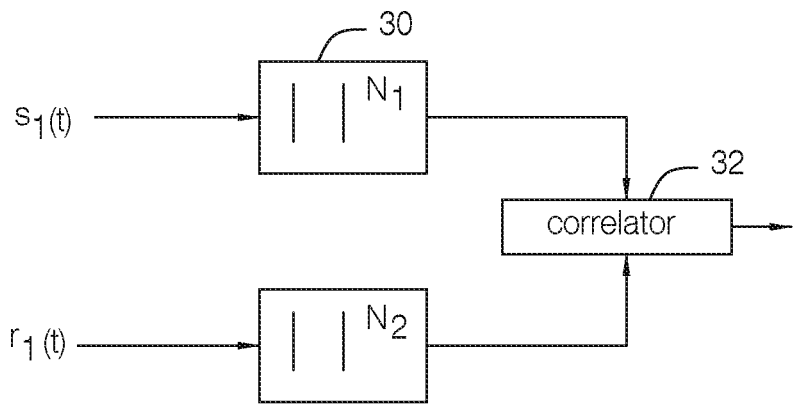
FIG. 4 is a third example of a magnitude correlator according to principles disclosed herein.

In one case, a potential offending signal that generates non-linear interference that falls into the same channel as a victim signal is detected. The potential offending signal and victim signal do not necessarily need to be for the same antenna, same radio, or even the same baseband unit. FIG. 2 shows one embodiment of how the victim signal, $r1(t)$ and potential offending signal, $s1(t)$, are processed to detect whether $s1(t)$ generates non-linear interference that exists in $r1(t)$. Each input signal goes through a magnitude-squared function (by multiplying the signal by its complex conjugate 26) prior to being input to the correlator 32. This means the top input of the correlator 32 is $|s1(t)|^2$. In FIG. 3, each signal goes through a magnitude determiner 30, which means the top input of the correlator 32 is $|s1(t)|$. In general, as shown in FIG. 4, the magnitude determiner 30 involves raising the magnitude to some exponent N, which means the input to the correlator 32 is $|s1(t)|^N$, where N is not required to be an integer, but cannot be less than 0. An advantage of different exponents depends on the implementation of the function. In some platforms there are dedicated functions that can calculate magnitude, while in others it might be less resource intensive to use the magnitude-squared. Embodiments also work if the magnitude function 16 is different for the two input signals as shown in FIG. 4. An example would be if the inputs to the correlator 32 are $|s1(t)|^2$ and $|r1(t)|$.

Figure 5:
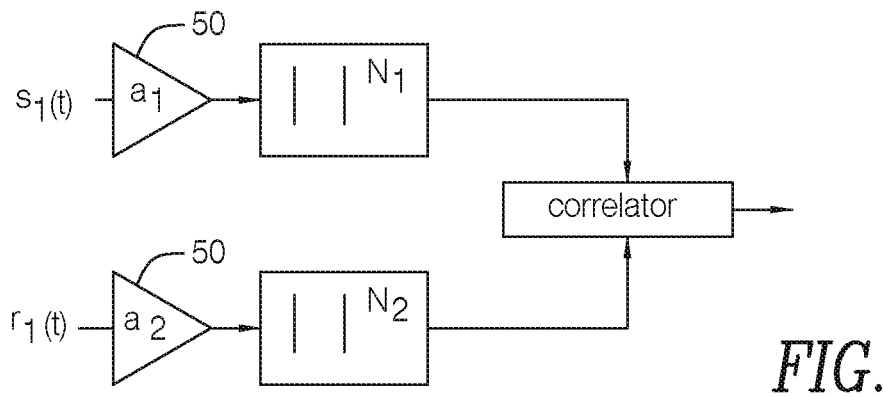
FIG. 5 is a fourth example of a magnitude correlator according to principles disclosed herein.
Figure 6:
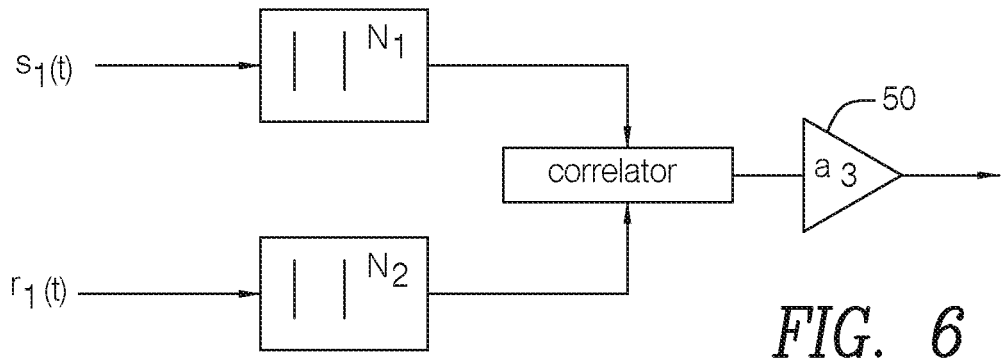
FIG. 6 is a fifth example of a magnitude correlator according to principles disclosed herein.

A variant of the diagrams in FIGS. 2-4 includes a scaling factor, on one of the inputs and/or on the output. FIG. 5 shows the diagram from FIG. 4 with multipliers 50 on the inputs, and FIG. 6 shows the diagram of FIG. 4 with the multiplier 50 on the output. One may appreciate that multipliers 50 on only one of the inputs, or the output, or on both inputs, or on both inputs and the output can all achieve the same result, with an appropriate choice of the multipliers 50. In one embodiment, the multipliers 50 could also be put between the magnitude determiners 30 and the correlator 32. An advantage of using multipliers 50 is to make the amplitude of the correlator outputs more useful to detect the level of non-linear interference, which can be important when comparing the correlator output between multiple instances of the correlation.

As an example, the configuration in FIG. 6 can be used with $N_1=N_2=2$. The value of the multiplier 50 on the output may be chosen to be the inverse of the product of the variances of the two input signals to the correlator 32. The input signals to the correlator 32 are $|s_1(t)|^2$ and $|r_1(t)|^2$, and their variances are denoted by $\sigma_{s1}^2$, and $\sigma_{r1}^2$, respectively. This means the multiplier coefficient is: $a_3=1/(\sigma_{s1}^2\sigma_{r1}^2)$.

Figure 7:
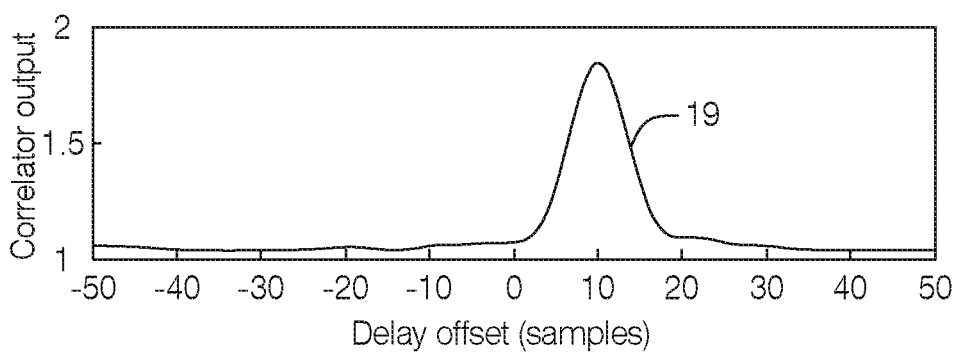
FIG. 7 is a graph of a correlator output.

Techniques used to perform the correlation function are well-established in the field of digital signal processing and are beyond the scope of this disclosure. The correlation(s) can be done in the time or frequency domain, and the number of data samples used is related to the resolution. FIG. 7 shows an example of an output 19 of the correlator 32 showing a peak at a delay of ten samples between the offending signal and the victim signal. The significance of this graph is discussed below.

Figure 8:
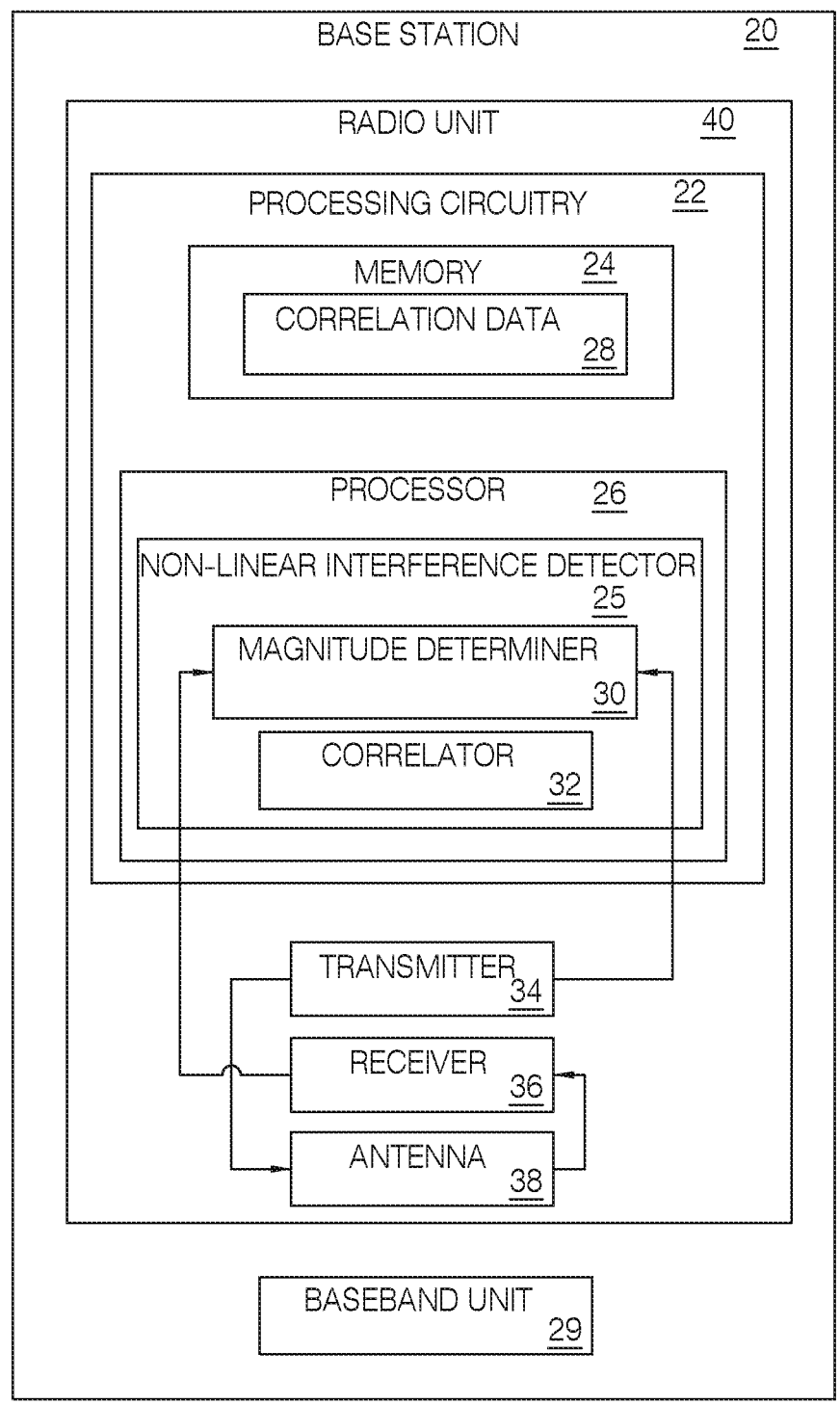
FIG. 8 is a block diagram of a base station having a radio unit which includes a non-linear interference detector.

FIG. 8 is a block diagram of a base station 20 constructed in accordance with principles set forth herein. The base station 20 includes processing circuitry 22, a transmitter 34, a receiver 36 and an antenna 38. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 stores correlation data 28 generated by the correlator 32. The processor 26 implements the non-linear interference detector 25, which includes the magnitude determiner 30 and correlator 32. In some embodiments, the processing circuitry 22, the transmitter 34, the receiver 36 and antenna 38 may be configured within a radio unit 40 of the base station 20. In the embodiment of FIG. 8, The victim signal may be from a baseband unit 29, and the transmitter 34 may be a source of an offending signal that is received by the receiver 36. Other sources of offending signals may be cables, the antenna 38, and physical hardware that generates passive intermodulation (PIM). The offending signal is coupled from the transmitter 34 to the correlator 32 of the processor 26. The victim signal is coupled from the receiver 36 to the correlator 32. The correlator 32 correlates a magnitude of the victim signal with a magnitude of the offending signal to produce an output signal indicative of an extent to which the two signals interfere.

Figure 9:
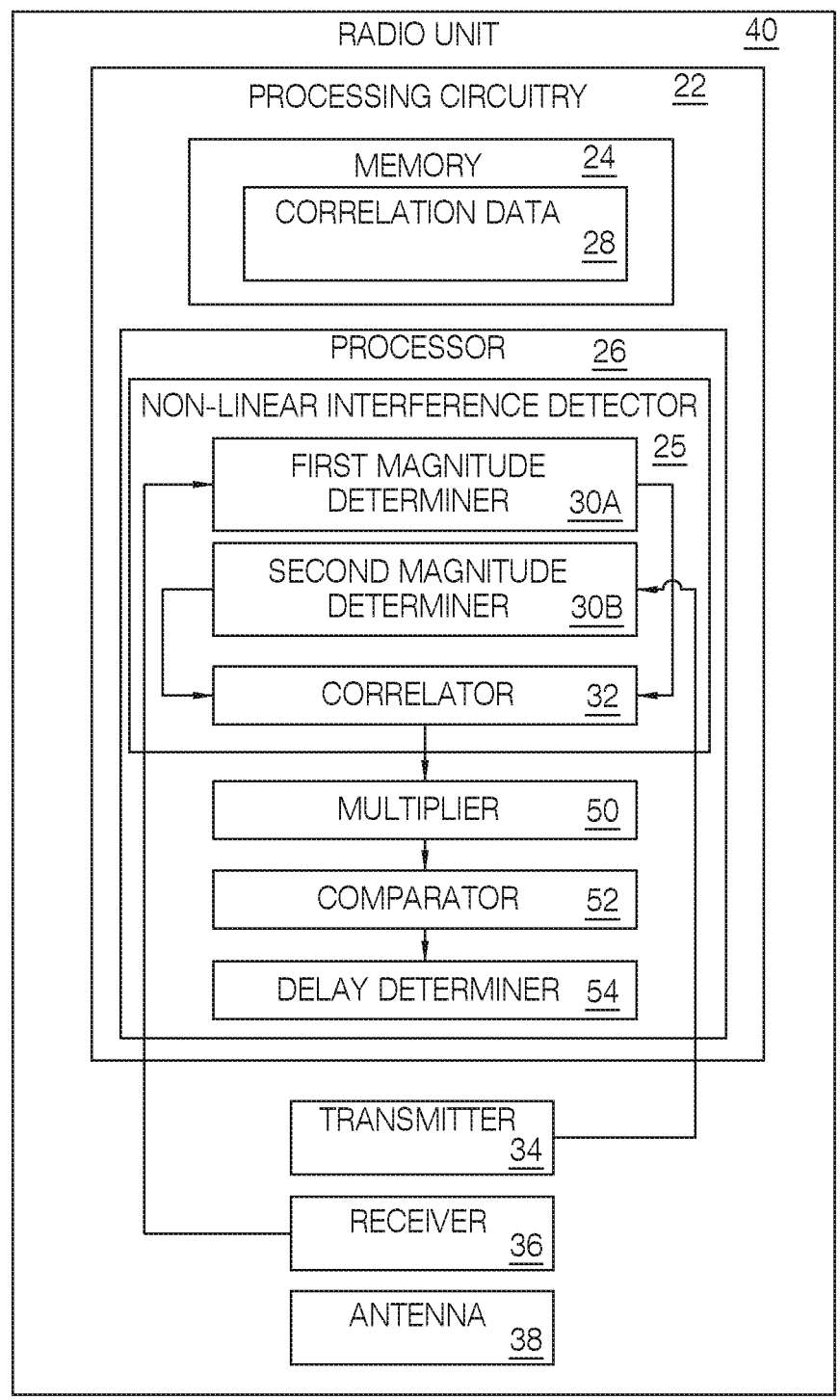
FIG. 9 is a more detailed block diagram of the radio unit.

A more detailed block diagram of the radio unit 40 is shown in FIG. 9. Referring to FIG. 9, a first magnitude determiner 30A performs the function of determining a magnitude of the victim signal raised to a first power to produce a first signal. A second magnitude determiner 30B determines a magnitude of the offending signal raised to a second power to produce a second signal. The correlator 32 correlates the first signal and the second signal to produce an output signal indicative of an extent to which the offending signal interferes with the victim signal. In some embodiments, the processor 26 may be configured to implement multiplication 50 of the victim signal and/or offending signal and/or correlator output. In some embodiments, the multiplication can be performed by a separate multiplier such as digital gain stage. In some embodiments, a comparator 52 is configured to compare a magnitude of an output signal determined from a correlation involving a first offending signal to a magnitude of the output signal determined from a correlation involving a second offending signal. A delay determiner 54 may be configured to determine from the output signal a delay between the victim signal and the offending signal.

Figure 10:
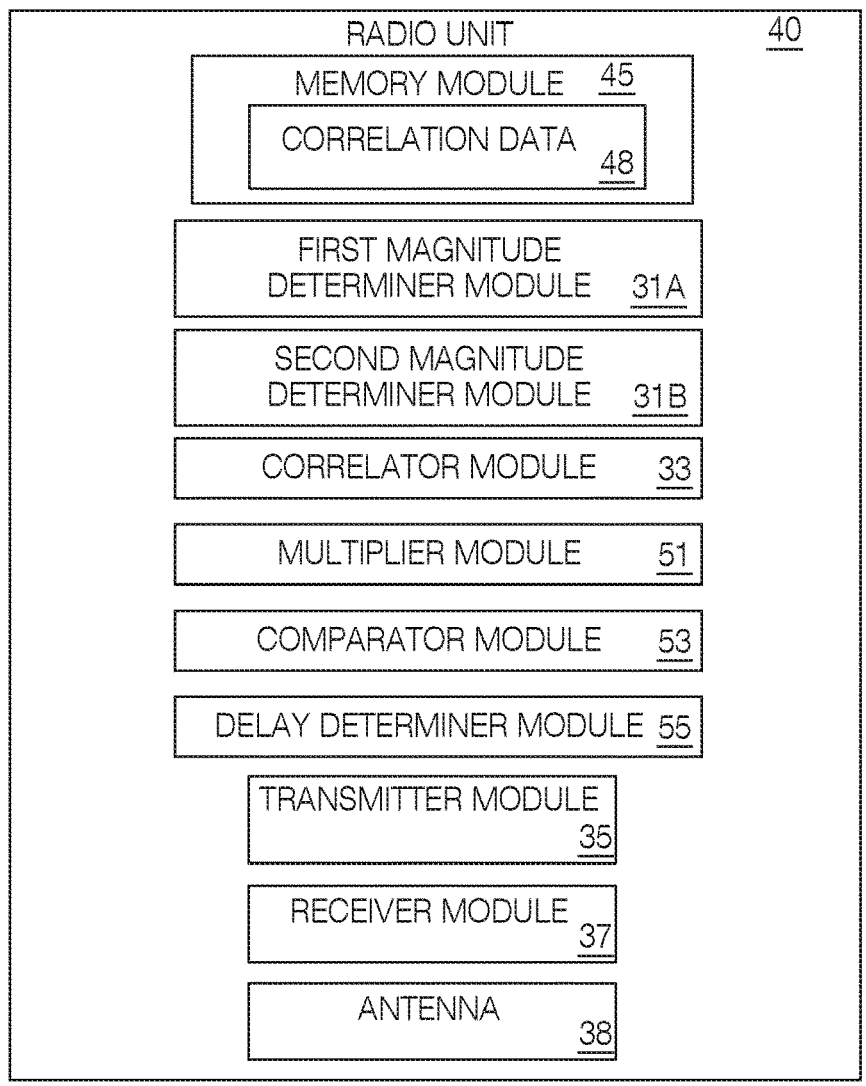
FIG. 10 is a block diagram of an alternative embodiment of the radio unit.

FIG. 10 is an alternative block diagram of the radio unit 40 having a memory module 45 configured to store correlation results 48. The radio unit may be implemented by software modules 31A, 31B, 33, 51, 53 and 55, that, when executed by a processor, cause the processor to perform the functions defined by the modules. The first magnitude determiner module 31A is configured to cause the processor to determine a magnitude of a victim signal raised to a first power to produce a first signal. The second magnitude determiner module 31B is configured to cause the processor to determine a magnitude of an offending signal raised to a second power to produce a second signal. The correlator module 33 is configured to cause the processor to correlate the first signal and the second signal to produce an output signal indicative of an extent to which the offending signal interferes with the victim signal. The multiplier module 51 is configured to cause the processor to multiply the victim signal and/or offending signal and/or correlator output by a multiplicative gain. The comparator module 53 is configured to cause the processor to compare a magnitude of an output signal determined from a correlation involving a first offending signal to a magnitude of the output signal determined from a correlation involving a second offending signal. The delay determiner module 55 is configured to cause the processor to determine from the output signal a delay between the victim signal and the offending signal. The radio unit 40 also includes a transmitter module 35, a receiver module 37 and an antenna 38.

Figure 11:
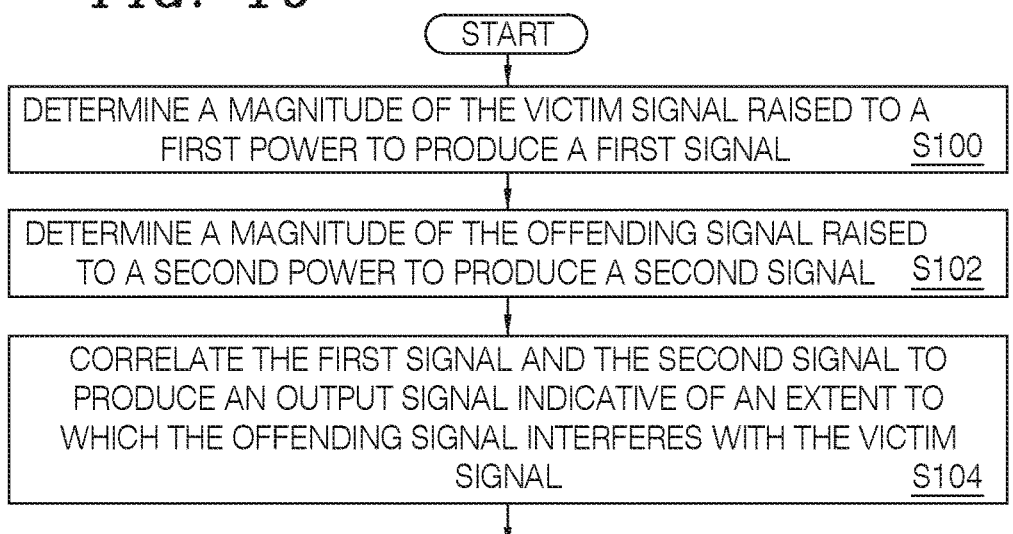
FIG. 11 is a flowchart of an exemplary process for interference detection

FIG. 11 is a flowchart of an exemplary process for detecting non-linear interference. The process includes determining via the magnitude determiner 30A a magnitude of a victim signal raised to a first power to produce a first signal (block S100). The process also includes determining via the magnitude determiner 30B a magnitude of an offending signal raised to a second power to produce a second signal (block S102). The first and second signals are correlated by the correlator 32 to produce an output signal indicative of an extent to which the offending signal interferes with the victim signal (block S104). The output signal may be used to determine a phase delay between the first signal and the second signal via the delay determiner 54. The output signal may also be compared via the comparator 52 to another output signal obtained from the correlation with the magnitude of the victim signal with the magnitude of another offending signal to determine what offending signal interferes more with the victim signal. The interference can then be cancelled, methods for which are known and are beyond the scope of this disclosure.

Consider an example, where two potential offending signals, $s1(t)$ and $s2(t)$, exist in some non-linear environment and one victim signal, $r1(t)$, is received. In this example, the two potential offending signals are transmitted at RF frequencies of f1, and f2 (let f1<f2), respectively, and the received signal is received at an RF frequency denoted by fr. The frequencies have the relationship, f3=2f1−f2, such that the received signal (fr) is close enough to the lower intermodulation (IM) frequency (f3) such that the two transmitted signals have the potential to generate non-linear interference that can fall into the received signal. The potential offending signal to test is chosen to be $s1(t)$, and the victim signal is $r1(t)$. The digital potential offending signal and digital victim signals are available with some arbitrary delays. If the non-linear behavior of the source of non-linear interference can be represented with a 3rd order non-linearity, and there are no memory effects in the signal paths or non-linear interference source (to simplify this example), then the victim signal in digital baseband can be written as:

$$r_1(n) = c_3 e^{j2\pi(f_r - f_s)nT_s} s_1^2(n - M_1) s_2^*(n - M_2) + r_{des}(n)$$

In this equation, the first term is the undesired non-linear interference with some unknown coefficient, c3, and the second term is the desired receive signal, $r_{des}(n)$. In known techniques, the first term is synthesized using the baseband signals of both $s1(t)$ and $s2(t)$ and calculates and applies the frequency shift fr−f3. Conventional systems also require determination of the delay offsets, including M1−M2.

In some embodiments described herein, with the configuration from FIG. 6 (with $N_1 = N_2 = 2$, and $a_3 = 1/(\sigma_{s1}^2 \sigma_{r1}^2)$), the output may be given by:

$$\text{Output}(m) = \frac{E[|s_1(n - M_1 - m)|^2 |r_1(n - M_3)|^2]}{E[|s_1(n)|^2] E[|r_1(n)|^2]}$$

A plot of this output(m) function is shown in FIG. 7 when the potential offending signal generates some non-linear interference that exists in the victim signal. This detection does not require generating and frequency shifting an estimate of the non-linear interference signal, or a model of the non-linear behavior, or knowledge of the differential delay offset M1−M2.

If the potential offending signal is generating non-linear interference that exists in the victim signal, then there will be at least one value of the correlation that is significantly larger than some other values (representing a peak, or multiple peaks) as shown in FIG. 7. Where the peaks occur relate to the time delay between the potential offending signal, and the victim signal. This delay can be useful for other applications that attempt to model and suppress the non-linear interference, or attempt to identify the sources of the non-linear behavior. To that end, some embodiments include a step of transferring one or more delay values to another application or hardware arrangement that could perform one of these functions. Some embodiments could also transfer the amplitude values at the corresponding delays. This would permit interpolation between samples to better estimate the location of a peak if it occurs between samples. The amplitude values can also be used to estimate the strength of the different non-linear interference products. The latter advantage only calls for transfer of the amplitude values, and not necessarily the delay values.

In one embodiment, prior information about the expected time delay between the potential offending signal and the victim signal can be used to reduce the amount of processing done by the correlator 32. As an example, this type of information could be used to limit the delay range in FIG. 7 between 5 and 15, which requires less processing than a larger range of offsets for the correlation.

The input signals should be at the same sampling rate. The signals can be up-sampled prior to applying them to one of the embodiments described above to permit a more accurate correlation amplitude and delay estimate. The input signals could also be down-sampled to reduce the computational burden of the correlators 32. However, the accuracy of the correlation amplitude and delay estimate could degrade. Up-sampling or down-sampling a digital signal are based on well-established techniques in the field of digital signal processing. Down-sampling is generally performed in a manner to avoid the negative impacts of aliasing. Embodiments described herein will work even if the down-sampling is done in a manner that does not avoid aliasing.

The embodiments described above can be applied simultaneously or sequentially to more than one offending signal for the same victim signal. This may be useful to determine a sub-set of signals from a group of potential offending signals that are involved in generating non-linear interference and affecting the victim signal and may be useful to detect which non-linear interference terms affect the victim signal.

When there are many potential offending transmit signals and many victim signals, then embodiments described above can be used for each pair. Some embodiments provide a low complexity way to determine which potential offending signals generate non-linear interference in which victim signals. Transferring the amplitude and delays in this case has the advantage of allowing another application to know which victim signals have the worst non-linear interference issues, and which potential offending signals are to blame. With knowledge of the frequencies and bandwidths of the signals, some pairs can be excluded. For example, this would be the case if only up to 5th order distortion was considered problematic, and there was no frequency combination for some sets of potential offending transmit signals that would generate 5th order non-linear interference in some victim signals channels.

The baseband representation of the potential offending signals could be captured from a few different places at a cellular site. For example, the actual baseband signals are typically generated in a baseband unit 29 and transmitted to the radio unit 40. This signal is available for reading/copying inside the baseband unit 29, along the front-haul link (i.e., a common public radio interface (CPRI) link), or inside the radio unit 40. Inside the radio unit 40 there can be some waveform processing that modifies the signal to be transmitted. Two examples are digital pre-distortion and peak to average power reduction. The baseband signals can be taken from before, after, or somewhere inside the waveform processing parts of the radio unit 40.

The offending signals may also be taken from auxiliary receivers. This could include additional receivers that are setup to monitor the signals from the surrounding environment, or from receivers that are used to perform other functions like an antenna observation receiver, or transmitter observation receiver. As an example, if embodiments are implemented inside a radio unit 40, then a baseband signal of some potential offending signal may not be available. This baseband signal could be obtained with auxiliary receivers that can monitor the potential offending signal. This could be done over-the-air with antennas, or via a transmission line using directional couplers. As another example, a transmitter observation receiver can be used to receive signals that leak through into the radio through the transmit passband of the front-end filter, or the actual transmit signal that is being observed. Similarly, an antenna observation receiver can also monitor signals present on the antenna-side of the front-end filter. If embodiments of the correlators 32 are not implemented inside the radio units 40, then the potential offending signals can be transferred back from the auxiliary receivers to the location of the correlators 32.

One potential source of non-linear interference is from nearby devices that are transmitting in the same band that a radio's receiver is operating, but usually in a different channel. When the signal from this nearby device is strong it can be referred to as a blocker. This is a known problem in cellular telecommunications, and one example is the near-far affect. The blocker signal represents a potential offending signal. The receiver can be used to receive the blocker signal and operate in its assigned channel simultaneously. Digital channel filters can be used to separate the blocker signal from the signal in the assigned receiver channel so that it can be used by the correlators 32. This also applies for multiple blocker signals.

The correlators 32 can be located at several different locations in a cellular network. The potential offending signal and victim signal should be transferred to the location of the correlators 32. These locations could be in the baseband unit 29 (at a site or virtualized in some other location), in a radio unit 40, or on some device that is able to read the front-haul data link. The correlators 32 could be located remotely where network monitoring data is typically processed and accessed by network operations and service groups.

Embodiments may benefit if a victim signal is channelized into multiple sub-channels (can be overlapping, or non-overlapping) prior to being applied to the correlators 32. Each sub-channel could then be used as a victim signal. Multiple non-linear interference frequencies can fall into the victim signal's channel. Using multiple sub-channels for the victim signal allows embodiments to be used to estimate which non-linear interference frequencies the potential offending signal is generating and impacting the victim signal.

Multiple instances of the magnitude determiner 30 and correlator 32 can be run in parallel. This is advantageous if there are multiple pairs of potential offending signals and victim signals to be considered, and the timeliness of the result does not permit a sequential approach with a single instance.

Some embodiments are as follows:

Embodiment 1

A non-linear interference detection method in a communication system having a victim signal and an offending signal, the method including:
determining a magnitude of the victim signal raised to a first power to produce a first signal;
determining a magnitude of the offending signal raised to a second power to produce a second signal; and
correlating the first signal and the second signal to produce an output signal indicative of an extent to which the offending signal interferes with the victim signal.

Embodiment 2

The method of Embodiment 1, wherein the first power and the second power are not equal.

Embodiment 3

The method of Embodiment 1, further comprising scaling at least one of the first and second signals prior to the correlation.

Embodiment 4

The method of Embodiment 1, further comprising scaling at least one of the victim signal and the offending signal.

Embodiment 5

The method of Embodiment 1, further comprising scaling the output signal.

Embodiment 6

The method of Embodiment 1, further comprising simultaneously performing the determining and correlating for each of a plurality of offending signals.

Embodiment 7

The method of Embodiment 6, further comprising comparing a magnitude of an output signal determined from a correlation involving a first offending signal to a magnitude of an output signal determined from a correlation involving a second offending signal.

Embodiment 8

The method of Embodiment 1, further comprising simultaneously performing the determining and correlating for each of a plurality of victim signals.

Embodiment 9

The method of Embodiment 1, further comprising determining from the output signal a delay between the victim signal and the offending signal.

Embodiment 10

A non-linear interference detector, comprising:
a first magnitude determiner configured to determine a magnitude of a victim signal raised to a first power to produce a first signal;

a second magnitude determiner configured to determine a magnitude of an offending signal raised to a second power to produce a second signal; and a correlator configured to correlate the first signal and the second signal to produce an output signal indicative of an extent to which the offending signal interferes with the victim signal.

Embodiment 11

The detector of Embodiment 10, wherein the first power and the second power are not equal.

Embodiment 12

The detector of Embodiment 10, further comprising at least one multiplier configured to scale at least one of the first and second signals prior to the correlation.

Embodiment 13

The detector of Embodiment 10, further comprising at least one multiplier configured to scale at least one of the victim signal and the offending signal.

Embodiment 14

The detector of Embodiment 10, further comprising an multiplier configured to scale the output signal.

Embodiment 15

The detector of Embodiment 10, further comprising: a third magnitude determiner configured to determine a magnitude of a second offending signal raised to a third power to produce a third signal; and a second correlator configured to correlate the first signal with the third signal to produce a second output signal indicative of an extent to which the second offending signal interferes with the victim signal.

Embodiment 16

The detector of Embodiment 15, further comprising a comparator configured to compare a magnitude of an output signal determined from a correlation involving a first offending signal to a magnitude of the output signal determined from a correlation involving the second offending signal.

Embodiment 17

The detector of Embodiment 10, further comprising a delay determiner configured to determine from the output signal a delay between the victim signal and the offending signal.

Embodiment 18

A non-linear interference signal processor, comprising:
a memory configured to store a correlation result; and
a processor in communication with the memory and configured to:
  determine a magnitude of a victim signal raised to a first power to produce a first signal;
  determine a magnitude of an offending signal raised to a second power to produce a second signal; and
  correlate the first signal and the second signal to produce an output signal indicative of an extent to which the offending signal interferes with the victim signal.

Embodiment 19

The signal processor of claim 18, wherein the first power is not equal to the second power.

Embodiment 20

The signal processor of claim 18, wherein the processor is further configured to scale at least one of the first and second signals prior to the correlation.

Another group of embodiments include the following:

1A. A non-linear interference detection method in a wireless communication system (10) having a victim signal and an offending signal, the method including:
determining a magnitude of the victim signal raised to a first power to produce a first signal (S100);
determining a magnitude of the offending signal raised to a second power to produce a second signal (S102); and
correlating the first signal and the second signal to produce an output signal indicative of an extent to which the offending signal interferes with the victim signal (S104).

2A. The method of Embodiment 1A, wherein the first power and the second power are not equal.

3A. The method of any of Embodiments 1A and 2A, further comprising scaling at least one of the first and second signals prior to the correlation.

4A. The method of any of Embodiments 1A-3A, further comprising scaling at least one of the victim signal and the offending signal.

5A. The method of any of Embodiments 1A-4A, further comprising scaling the output signal.

6A. The method of any of Embodiments 1A-5A, further comprising simultaneously performing the determining and correlating for each of a plurality of offending signals.

7A. The method of any of Embodiments 1A-6A, further comprising:
determining a magnitude of a second offending signal raised to a third power to produce a third signal; and
correlating the first signal with the third signal to produce a second output signal indicative of an extent to which the second offending signal interferes with the victim signal.

8A. The method of any of Embodiments 1A-7A, further comprising comparing a magnitude of an output signal determined from a correlation involving a first offending signal to a magnitude of an output signal determined from a correlation involving a second offending signal.

9A. The method of any of Embodiments 1A-8A, further comprising simultaneously performing the determining and correlating for each of a plurality of victim signals.

10A. The method of any of Embodiments 1A-9A, further comprising determining from the output signal a delay between the victim signal and the offending signal.

11A. A non-linear interference detector (25), comprising:
a first magnitude determiner (30A) configured to determine a magnitude of a victim signal raised to a first power to produce a first signal;
a second magnitude determiner (30B) configured to determine a magnitude of an offending signal raised to a second power to produce a second signal; and
a correlator (32) configured to correlate the first signal and the second signal to produce an output signal indicative of an extent to which the offending signal interferes with the victim signal.

12A. The detector (25) of Embodiment 11A, wherein the first power and the second power are not equal.

13A. The detector (25) of any of Embodiments 11A and 12A, further comprising at least one multiplier (50) configured to scale at least one of the first and second signals prior to the correlation.

14A. The detector (25) of any of Embodiments 11A-13A, further comprising at least one multiplier (50) configured to scale at least one of the victim signal and the offending signal.

15A. The detector (25) of any of Embodiments 11A-14A, further comprising a multiplier (50) configured to scale the output signal.

16A. The detector (25) of any of Embodiments 11A-15A, wherein the determining and correlating for each of a plurality of offending signals are performed simultaneously.

17A. The detector (25) of any of Embodiments 11A-16A, further comprising:
a third magnitude determiner (30) configured to determine a magnitude of a second offending signal raised to a third power to produce a third signal; and
a second correlator (32) configured to correlate the first signal with the third signal to produce a second output signal indicative of an extent to which the second offending signal interferes with the victim signal.

18A. The detector (25) of any of Embodiments 11A-17A, further comprising a comparator (52) configured to compare a magnitude of an output signal determined from a correlation involving a first offending signal to a magnitude of the output signal determined from a correlation involving the second offending signal.

19A. The detector (25) of any of Embodiments 11A-18A, wherein the determining and correlating for each of a plurality of victim signals is performed simultaneously.

20A. The detector (25) of any of Embodiments 11A-19A, further comprising a delay determiner (54) configured to determine from the output signal a delay between the victim signal and the offending signal.

21A. A radio unit (40) configured to detect non-linear interference, the radio unit comprising:
processing circuitry (22) including a memory (24) and a processor (26):
the memory (24) configured to store a correlation result; and
the processor (26) in communication with the memory (24) and configured to:
determine a magnitude of a victim signal raised to a first power to produce a first signal;
determine a magnitude of an offending signal raised to a second power to produce a second signal; and
correlate the first signal and the second signal to produce an output signal indicative of an extent to which the offending signal interferes with the victim signal.

22A. A radio unit (40) configured to detect non-linear interference, the radio unit comprising:
a first magnitude determiner module (31A) configured to determine a magnitude of a victim signal raised to a first power to produce a first signal;
a second magnitude determiner module (31B) configured to determine a magnitude of an offending signal raised to a second power to produce a second signal;
and a correlator module (53) configured to correlate the first signal and the second signal to produce an output signal indicative of an extent to which the offending signal interferes with the victim signal.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A non-linear interference detection method in a wireless communication system having a victim signal and an offending signal, the method including:
   determining a magnitude of the victim signal raised to a first power to produce a first signal;
   determining a magnitude of the offending signal raised to a second power to produce a second signal, wherein the first power and the second power are not equal; and
   correlating the first signal and the second signal to produce an output signal indicative of an extent to which the offending signal interferes with the victim signal.

2. The method of claim 1, further comprising scaling at least one of the first and second signals prior to the correlation.

3. The method of claim 1, further comprising scaling at least one of the victim signal and the offending signal.

4. The method of claim 1, further comprising scaling the output signal.

5. The method of claim 1, further comprising simultaneously performing the determining and correlating for each of a plurality of offending signals.

6. The method of claim 1, further comprising:
   determining a magnitude of a second offending signal raised to a third power to produce a third signal; and
   correlating the first signal with the third signal to produce a second output signal indicative of an extent to which the second offending signal interferes with the victim signal.

7. The method of claim 6, further comprising comparing the magnitude of the output signal determined from the correlation involving the offending signal to the magnitude of the second output signal determined from the correlation involving the second offending signal.

8. The method of claim 1, further comprising simultaneously performing the determining and correlating for each of a plurality of victim signals.

9. The method of claim 1, further comprising determining from the output signal a delay between the victim signal and the offending signal.

10. A non-linear interference detector, comprising:
    a first magnitude determiner configured to determine a magnitude of a victim signal raised to a first power to produce a first signal;
    a second magnitude determiner configured to determine a magnitude of an offending signal raised to a second power to produce a second signal, wherein the first power and the second power are not equal; and
    a correlator configured to correlate the first signal and the second signal to produce an output signal indicative of an extent to which the offending signal interferes with the victim signal.

11. The detector of claim 10, further comprising at least one multiplier configured to scale at least one of the first and second signals prior to the correlation.

12. The detector of claim 10, further comprising at least one multiplier configured to scale at least one of the victim signal and the offending signal.

13. The detector of claim 10, further comprising a multiplier configured to scale the output signal.

14. The detector of claim 10, wherein the determining and correlating for each of a plurality of offending signals are performed simultaneously.

15. The detector of claim 10, further comprising:
    a third magnitude determiner configured to determine a magnitude of a second offending signal raised to a third power to produce a third signal; and
    a second correlator configured to correlate the first signal with the third signal to produce a second output signal indicative of an extent to which the second offending signal interferes with the victim signal.

16. The detector of claim 15, further comprising a comparator configured to compare the magnitude of the output signal determined from the correlation involving the offending signal to the magnitude of the second output signal determined from the correlation involving the second offending signal.

17. The detector of claim 10, wherein the determining and correlating for each of a plurality of victim signals is performed simultaneously.

18. The detector of claim 10, further comprising a delay determiner configured to determine from the output signal a delay between the victim signal and the offending signal.

19. A radio unit configured to detect non-linear interference, the radio unit comprising:
    processing circuitry including a memory and a processor:
       the memory configured to store a correlation result; and
       the processor in communication with the memory and configured to:
          determine a magnitude of a victim signal raised to a first power to produce a first signal;
          determine a magnitude of an offending signal raised to a second power to produce a second signal, wherein the first power and the second power are not equal; and
          correlate the first signal and the second signal to produce an output signal indicative of an extent to which the offending signal interferes with the victim signal.

20. A radio unit configured to detect non-linear interference, the radio unit configured to:
    determine a magnitude of a victim signal raised to a first power to produce a first signal;
    determine a magnitude of an offending signal raised to a second power to produce a second signal, wherein the first power and the second power are not equal; and correlate the first signal and the second signal to produce an output signal indicative of an extent to which the offending signal interferes with the victim signal.

* * * * *